United States Patent
Corey et al.

(10) Patent No.: US 6,707,014 B1
(45) Date of Patent: Mar. 16, 2004

(54) OVEN APPARATUS FOR EFFICIENTLY COOKING FOOD

(76) Inventors: Dave O. Corey, 9109 Williams Rd., Rogers, AR (US) 72756; Jeffrey C. Davis, 802 Cedar La., Prairie Grove, AR (US) 72753

( * ) Notice: Subject to any disclaimer, the term of this patent is extended or adjusted under 35 U.S.C. 154(b) by 15 days.

(21) Appl. No.: 10/039,286

(22) Filed: Jan. 4, 2002

Related U.S. Application Data

(60) Provisional application No. 60/260,108, filed on Jan. 5, 2001.

(51) Int. Cl.[7] .................. B65G 15/30; B65G 17/14; A21B 1/48; F27B 9/06
(52) U.S. Cl. .................. 219/494; 99/443 C; 198/844.1; 198/853
(58) Field of Search ................. 219/388, 494; 198/804, 810.01, 844.1, 853; 99/443 C

(56) References Cited

U.S. PATENT DOCUMENTS

| | | | | |
|---|---|---|---|---|
| 3,249,741 A | * | 5/1966 | Mills | |
| 3,721,805 A | * | 3/1973 | Barratt | 219/388 |
| 4,389,562 A | * | 6/1983 | Chaudoir | 219/388 |
| 4,446,358 A | * | 5/1984 | Comerford et al. | 219/388 |
| 4,554,437 A | * | 11/1985 | Wagner et al. | 219/388 |
| 4,565,704 A | * | 1/1986 | Dagerskog et al. | 99/443 C |
| 5,112,630 A | * | 5/1992 | Scott | 99/443 C |
| 5,253,564 A | * | 10/1993 | Rosenbrock et al. | 99/443 C |
| 6,501,051 B1 | * | 12/2002 | Richert et al. | 219/388 |

FOREIGN PATENT DOCUMENTS

| | | | |
|---|---|---|---|
| DE | 19624445 | * | 1/1998 |
| EP | 903100 | * | 3/1999 |
| JP | 64053912 | * | 3/1989 |

* cited by examiner

*Primary Examiner*—Joseph Pelham
(74) *Attorney, Agent, or Firm*—Keisling Pieper & Scott PLC; Trent C. Keisling; David B Pieper

(57) ABSTRACT

A conveyor oven for cooking food items, having a conveyor belt that passes through the oven. The conveyor belt may include a plurality of tablets composed of a stone-like material attached to a stainless steel linking assembly, or alternatively, a drive chain. Infrared radiation heat sources are provided above and below the conveyor belt. Food passing through the oven on the conveyor belt is cooked by heat transferred directly from radiant heat sources. Cooking is also facilitated by heating stone-like tablets of the conveyor belt with infrared heat sources inserted inside the conveyor belt loop. Heat is transferred from the tablets to the food items, producing superior qualities in the cooked food. Waste heat is reduced by providing a means for automatic control of the heating elements.

5 Claims, 21 Drawing Sheets

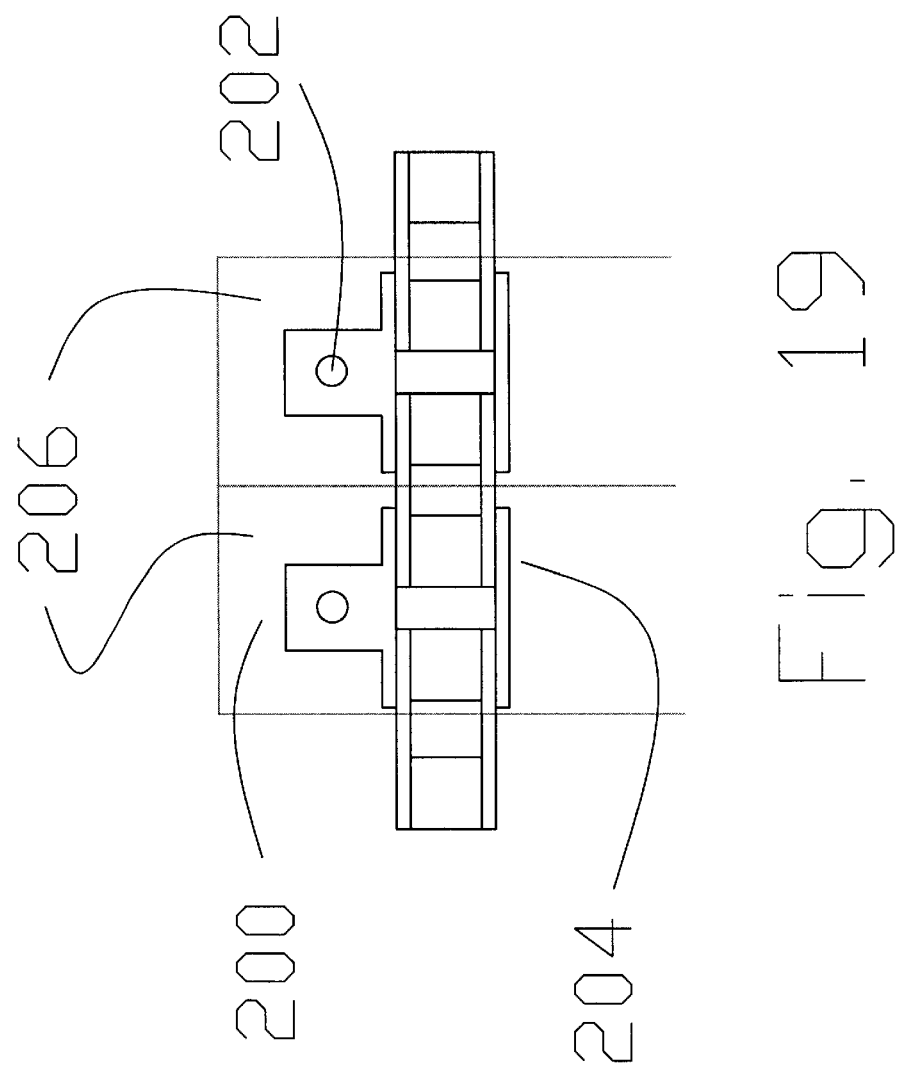

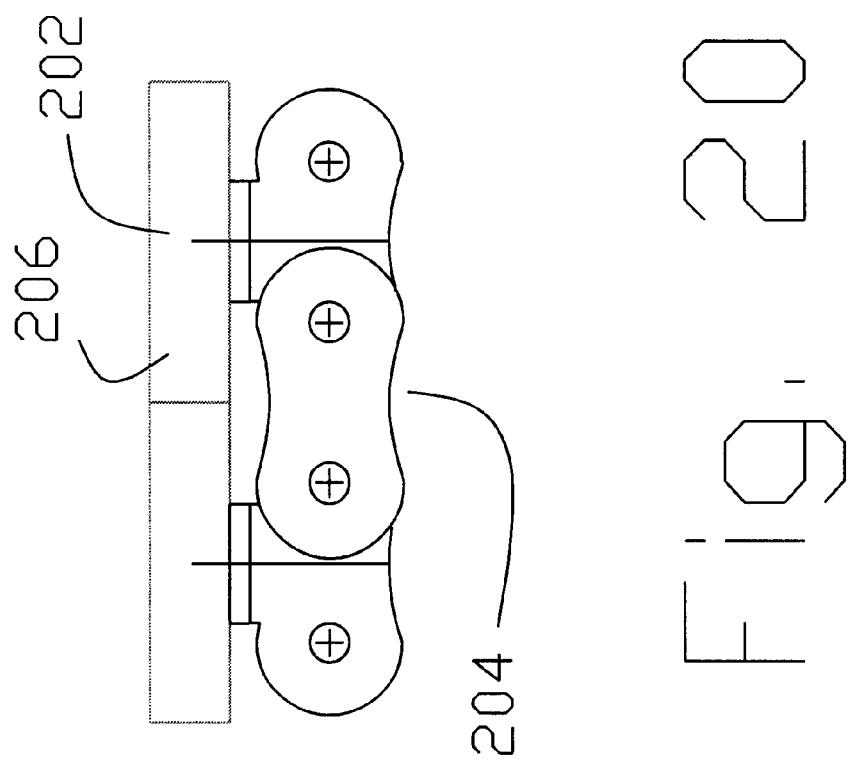

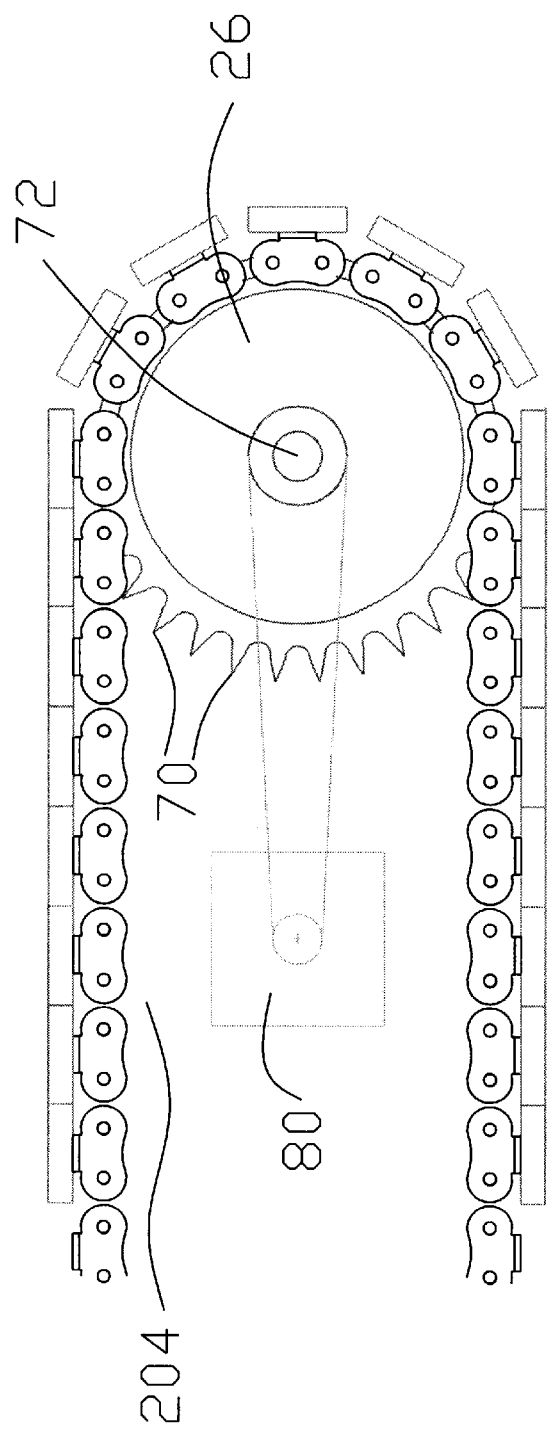

OVEN APPARATUS FOR EFFICIENTLY COOKING FOOD

CROSS-REFERENCE TO RELATED APPLICATIONS

This application is a continuation-in-part of provisional application Ser. No. 60/260,108, filed Jan. 5, 2001, which is hereby incorporated by reference.

BACKGROUND OF THE INVENTION

1. Field of the Invention

The present invention generally relates to an improved oven for continuously cooking food. In particular, the present oven efficiently cooks food while minimizing heat loss. Known art may be found in U.S. classes 99 and 198 and the subclasses thereunder.

2. Known Art

As will be appreciated by those skilled in the art, restaurants and the like use radiant or convective ovens extensively during food preparation. Ovens can be categorized as either a conveyor type that operates in a steady-state fashion or as a conventional type that operates in a batch wise fashion. Regardless of the type, both are plagued by waste heat that is usually transmitted to the surrounding atmosphere (i.e. the restaurant or other facility). It is desirable to minimize such losses.

In high volume commercial and restaurant operations, conveyor ovens have replaced more traditional baking ovens in some circumstances. A conveyor oven can significantly reduce the amount of cooking time compared to other types of ovens. Conveyor ovens also cook food in a generally healthier manner as well as requiring less training and/or experience for proper use.

Conveyor ovens typically use a stainless steel continuous conveyor belt to carry individual food items through the heated portion of an oven. These ovens have a first opening through which uncooked food enters and a second spaced apart opening on the opposite end of the oven through which cooked food exits. An endless conveyor belt passes through this cooking tunnel and extends past both openings sufficiently to allow safe insertion and retrieval of food products. The only limit to how many identical food items may be placed in the oven and cooked is the speed of the conveyor belt which correlates to the residence time to sufficiently cook the food items. This arrangement allows individual food items to be continuously placed on the conveyor belt for sequential steady state cooking. This is significantly faster than conventional ovens in which each food item must wait its turn since they are cooked batch wise.

In restaurants conducting a high volume of business, the speed of cooking provided by a conveyor oven is often quite advantageous. A conveyor oven usually reduces the preparation time for a food order, which leads to increased customer satisfaction. It may also allow a restaurant to serve a larger number of customers. When the food items offered by a restaurant are to be cooked at the same temperature for the same amount of time, a conveyor oven is particularly advantageous. The operator need only set the temperature and conveyor belt speed as necessary to cook the selected foods. Once these two parameters are set, the oven may be operated continuously without any adjustment. Even a person unskilled in the art of cooking is able to prepare high quality cooked food products simply by placing them on the conveyor belt of this type of oven. The ease of operation and high throughput of conveyor ovens makes them highly desirable in restaurants and other commercial and industrial settings.

A single food order at a restaurant may include a variety of different actual food items. Those skilled in the art of cooking will appreciate that different food items require a variety of different cooking times. However, it is desirable to serve all of the food items in a single food order at the same time. Food items that are prepared quickly may cool significantly while waiting for an accompanying food item to finish cooking. In addition, foods requiring a longer cooking time than accompanying food items may be undercooked so that the other food items are not overly cooled when served.

In an effort to combat these problems, many restaurants use heat lamps to keep food warm while waiting for accompanying food items to finish cooking. This is an imperfect solution. Some food items may remain under a heat lamp for an extended period of time. This causes some food items to dry out. Extended exposure to heat lamps also causes the plate on which the food items rest to become uncomfortably hot. It is also believed that exposure to heat lamps has a deleterious effect on both the flavor and texture of the food items. The use of heat lamps also does not guarantee that all food items will be served at the same temperature. The actual temperature of the food items will depend on how much time they have spent underneath a heat lamp.

It also is well known in the art of cooking that brick or stone ovens provide superior flavor and texture to foods. Connoisseurs of pizzas and breads, as well as fish and meats prefer the qualities that only a stone or brick oven can impart to these food products. However, stone or brick ovens are difficult to operate. Only those well skilled in the art of cooking with these types of ovens can properly bake food items evenly and without burning the food products. This means that a restaurant must pay a higher salary to employ one skilled in stone or brick oven operation. This is an economic disadvantage to a restauranteur. Additionally, these ovens have traditionally been capable of cooking only one item at a time. This means that individual food orders require more time to prepare since they must be cooked in a batch wise fashion. The skill required by the operator and slow throughput makes these ovens more expensive to operate than conveyor ovens or other conventional ovens. While the food items have superior flavor and texture, they are more expensive and slower than both conventional and conveyor ovens. This results in a higher price for the customer. This also means that a restaurant can not accommodate as many customers and customers must wait a longer period of time for their food orders to be prepared.

In a stone or brick oven, the heat is imparted to the baked food item through the stone or brick surface on which it rests during cooking. It is believed that this heat transfer from a stone-like material to the food item is responsible for the superior flavor and texture of food items prepared in this manner.

Conveyor ovens typically use conveyor belts comprised of stainless steel rods spaced apart by linking elements to mimic the grating found on a grill. In this manner heat is applied directly to the baked food product. This is sufficient to properly cook items and also facilitates cooking methods such as "flame broiling." However, the flavor and texture this grill-style baking imparts to food items is believed to be inferior to that of a stone or brick oven.

It is also well known in the art that food items may be cooked much more quickly when they are fried rather than baked. Unfortunately, fried foods are much less healthy than baked food products. As people and our society in general become more health conscious, there is a greater desire for healthier food items. Although baking is significantly healthier than frying food items, it is a much slower process. This makes baking food items a less desirable cooking method in restaurants having a high volume of business.

It is particularly desirable to replace deep frying in commercial and/or industrial settings where a high volume is necessary. This is especially true with the increasing popularity of pre-prepared meals that are generally prepared by a wholesaler and/or purchasing company for subsequent resale to an end-user who simply reheats the pre-cooked meal. This is thus a need to prepare large volumes of food that previously did not exist.

As mentioned previously, another serious disadvantage of many ovens is their significant output of waste heat. Particularly, when convection heating is used in a conveyor oven, much of the heated air escapes from the entrance and exit openings in the oven. This results in higher overhead costs, a less comfortable work environment for the oven operators, and greater cost in maintaining a comfortable ambient temperature throughout a restaurant.

It is thus desirable to develop a cooking method that allows a variety of food items to be served at the same time and temperature without a reduction in quality.

It is also desirable to develop a healthy method of food preparation capable of high throughput.

It is also desirable to develop a cooking method that imparts both the superior food quality of a stone oven and the significant economic advantages of a conveyor oven.

It is also desirable to develop a cooking method that reduces the amount of waste heat produced by an oven.

Another desirable improvement would be a high throughput volume for an infrared oven sufficient to permit its use in industrial and commercial settings.

It is also desirable to reduce deep frying for industrially and/or commercially prepared foods.

Yet another desirable improvement would be an infrared conveyor oven able to be employed by industrial users to quickly prepare large quantities of food in a healthy manner for subsequent sale to end users as pre-cooked meals.

SUMMARY OF THE INVENTION

The present invention overcomes the perceived problems with the known art. The present invention provides an improved oven that utilizes variably powered infrared cooking elements to quickly, efficiently and thoroughly cook various foods while minimizing waste heat. The improved ovens can be in the form of conventional ovens or in the form of a conveyor type oven.

One exemplary embodiment combines the advantages of stone-like ovens and those of conveyor ovens. This embodiment provides a conveyor oven that includes a stone-like conveyor belt. The outside surface of the conveyor belt is made of a stone-like material. This stone-like material is generally actual stone, brick or ceramic material capable of being molded or cut to a desired shape.

A conveyor oven is provided that heats food items from both the top and bottom in the tunnel portion of the oven. Additionally, heat sources may also be placed on the sides of the tunnel portion of the oven. These heating sources may be of any type known in the art, such as convection, flame or infrared radiation. Ideally, the heat sources used provide only infrared radiation generated by either gas powered heat plenums, gas powered porous grates, electric heating coils within the infrared radiation source, or any other method of generating infrared radiation for cooking. These methods of infrared radiation heating are well known in the art. Infrared radiation sources are preferred because of their high efficiency and low amount of waste heat generated. This provides an oven that is less expensive to operate, while also leading to a more comfortable working environment for the operators and lower cost in maintaining a comfortable dining environment.

Infrared radiation heat sources are also known in the art to cook food items from the inside out. This shortens the time required to cook a particular item. This also provides for a baking oven with a significantly greater throughput. This allows high volume restaurants to prepare a large number of food items quickly, in a healthy manner.

The bottom heating element is located within the loop of the continuous conveyor belt. This provides efficient heating of the conveyor belt itself, which then transfers heat to the food items resting upon it. Sufficient heating of the conveyor belt is necessary to facilitate the heat transfer necessary to impart superior quality to the food items.

The conveyor oven has at least one temperature sensing means. Preferably there are two temperature sensing means. One senses the temperature within the tunnel portion of the oven. The second measures either the temperature directly below the upper part of the conveyor belt or the temperature of the upper part of the conveyor belt itself.

The conveyor oven has a temperature controller and thermometers in the tunnel portion of the oven for controlling the cooking temperature therein. This includes means of adjusting the heating element within the loop of the conveyor separately from the heating elements on the top and sides of the tunnel. This ensures the important proper heat transfer rate through the conveyor belt.

The path of the conveyor belt includes at least one support device that may take the form of a shelf ledge or a roller. Because a stone-like conveyor belt is heavy, support must be used to prevent sagging of the belt on its path through the tunnel portion of the oven. The support devices may extend the entire width of the conveyor belt, or may operate only on a portion of the belt. They may be located on the lateral ends of the belt's pathway, or may be located in the center. The support devices may also include means such as teeth or grooves to maintain the belt on a straight path.

Located on at least the output end and possibly on the input end of the conveyor belt loop is a sprocket. The sprocket includes teeth designed to engage the conveyor belt. The sprocket is powered by a motor sufficiently powerfull to move the conveyor belt at a constant speed through the loop pathway. The present invention also includes a means to adjust the speed of the sprocket, thereby adjusting the speed of the conveyor belt. This in turn adjusts the cooking time of the food items.

The conveyor belt includes a series of stone-like tablets extending the width of the conveyor belt. The tablets are sequentially aligned in the longitudinal direction of the conveyor belt. On both ends of the individual tablets are bracket assemblies. These bracket assemblies include a means of attachment to the tablet, a means of connecting to the bracket assembly on the opposite end of the same tablet and a means of rotatably attaching to bracket assemblies in front of and behind it. Alternatively, tablets may be directly connected to one or more drive chains.

Successive tablets may fit together in a tongue and groove fashion. The forward facing ends of the tablets have a downward wedge shape while the backward facing ends have an upward wedge shape. This provides a continuous, rather than a grated, surface for the food to be cooked on. This increases the heat transfer from the tablets to the food items and decreases the heat transfer directly from the heat source to the food items.

In another exemplary embodiment, there is also provided a conveyor oven having automatically adjusting infrared heating elements. Means are provided for detecting when a food item enters the oven. Upon detection of such a food item, the heating elements within the oven automatically turn on. The oven automatically determines when the food item exits the oven.

Upon exit of the food item, the heating elements automatically turn off. This greatly increases energy efficiency and conservation. In addition, the reduced waste heat provides for a more comfortable environment for the oven operators. A more comfortable ambient temperature is also more easily maintained in the absence of excess of waste heat.

In another exemplary embodiment, it is desirable to utilize the foregoing stainless steel conveyor oven with infrared heating elements to improve the throughput of commercial and/or industrial facilities. The conveyor oven permits many foods to be cooked quickly and healthily. Of course, this embodiment is necessarily sized larger to handle larger volumes of food. This embodiment extends the usefulness of the oven to industrial and commercial users as well. Such users are often interested in selling pre-cooked meals to consumers for in-home consumption.

In another exemplary embodiment, there is provided a conveyor oven having infrared heating means for the final preparation of several items. Food items that have completed cooking in different amounts of time, are placed in infrared heating conveyor oven. In this manner, all of the food items are heated to the same temperature for the same amount of time. Because the infrared heating elements heat food items from the inside out, over cooking and drying out of food items is avoided. Food items prepared using this infrared re-heating oven retain their texture and flavor. This offers a significant advantage over the use of heating lamps.

Thus, a principal object of the present invention is to provide an efficient oven that produces significantly less waste heat than other types of ovens.

It is another object of this invention to provide an oven that incorporates the efficiency, ease of use and speed of a conveyor oven with the superior cooking qualities of a stone oven.

It is a further object of this invention to provide a conveyor belt for use in a conveyor oven partially made of a stone-like material.

It is a further object of this invention to provide a conveyor oven in which heat from the heat source is not transferred directly to the food item but rather indirectly through a heat medium located on the conveyor belt.

It is a further object of this invention to provide an oven that produces superior cooked food items with a minimum of waste heat.

It is a further object of this invention to provide a high throughput method of baking healthy food items.

It is a further object of this invention to provide a method of serving multiple food items at the same time, at the same temperature, without a reduction in food quality.

Yet another object of the present invention is the provision of an industrial sized infrared conveyor oven that may be used for the preparation of pre-cooked meals for consumers.

BRIEF DESCRIPTION OF THE DRAWINGS

FIG. 19 is a partially fragmented, top plan view of another exemplary embodiment with portions omitted for clarity.

FIG. 20 is a side elevational view thereof.

FIG. 21 is another side elevational view thereof.

DETAILED DESCRIPTION OF THE PREFERRED EMBODIMENTS

Figure 1:
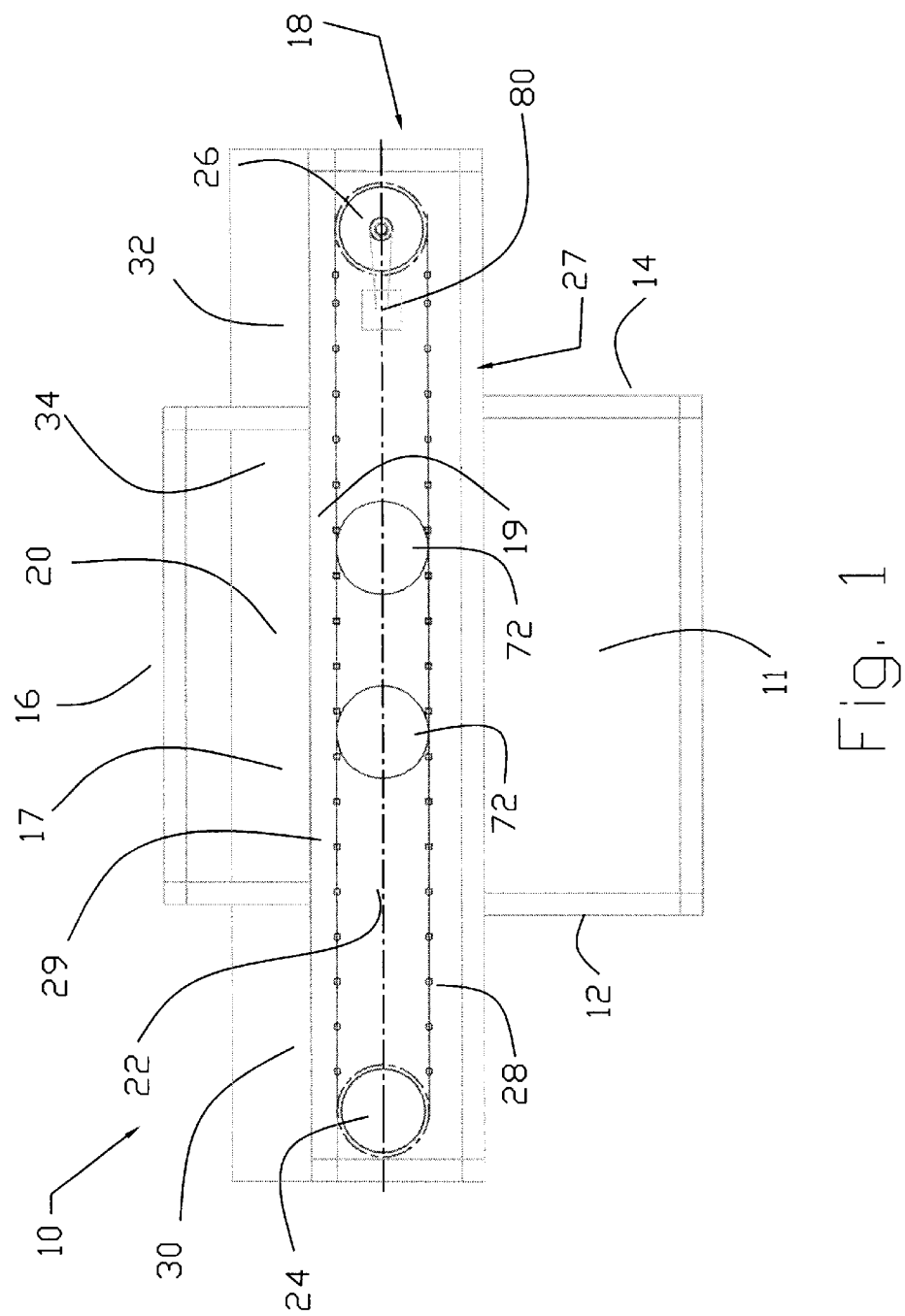
FIG. 1 is a partially fragmented side elevational view, of an exemplary embodiment of the invention with portions omitted for clarity.
Figure 2:
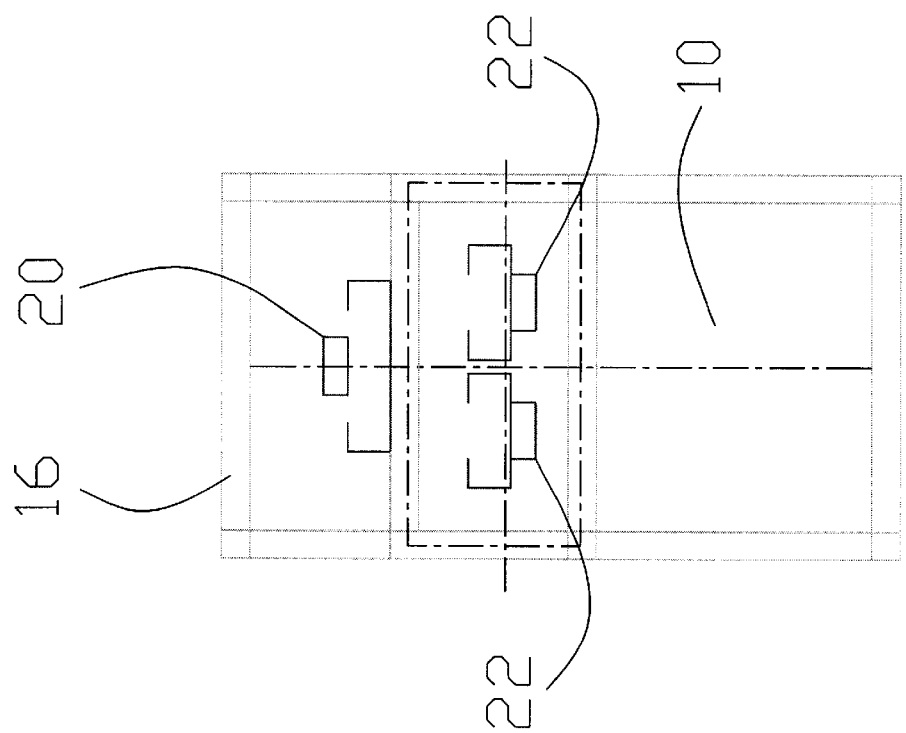
FIG. 2 is a front elevational view thereof.
Figure 3:
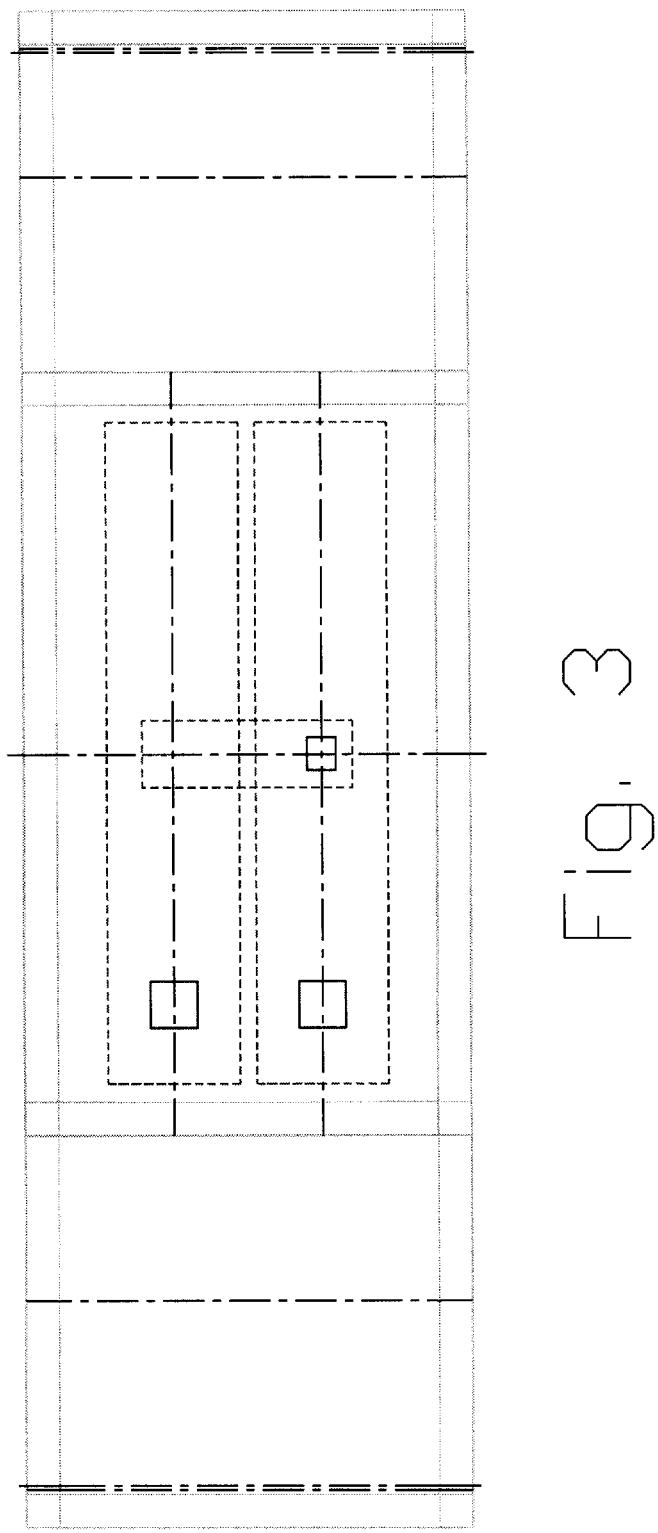
FIG. 3 is a top plan view thereof.
Figure 4:
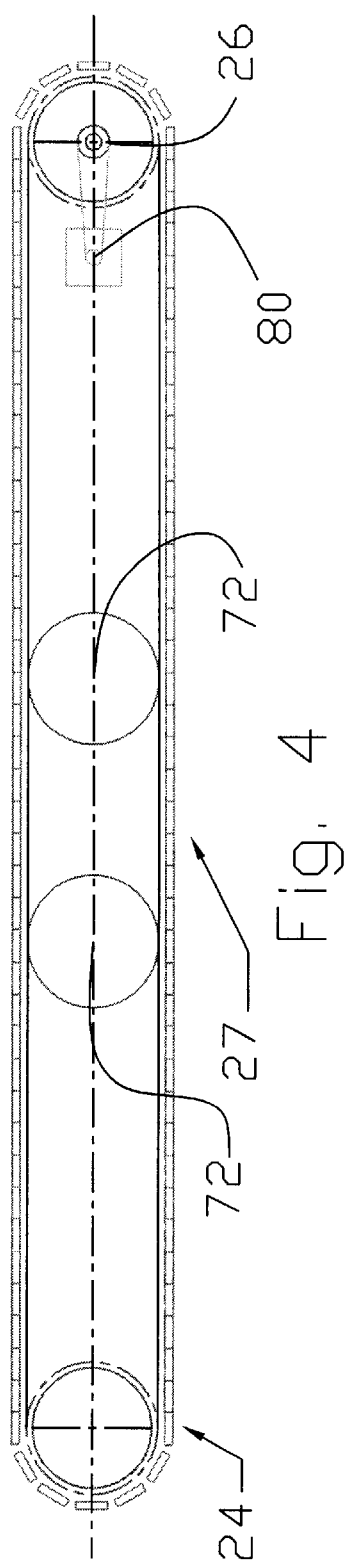
FIG. 4 is a side elevational view of the conveyor belt.
Figure 5:
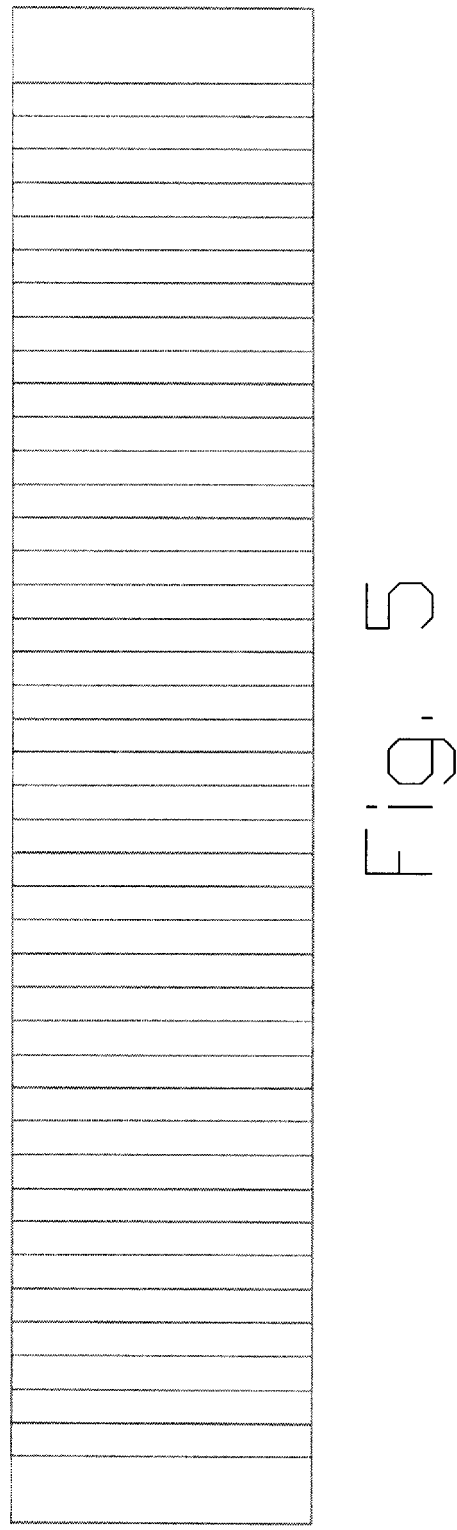
FIG. 5 is a top plan view of the conveyor belt.

The present invention combines the advantages of stone-like ovens and those of conveyor ovens. In one exemplary embodiment, there is provided a conveyor oven that uses a stone-like conveyor belt. The outside surface of the conveyor belt is made of a stone-like material. This stone-like material is generally actual stone, brick or ceramic material capable of being molded or cut to a desired shape.

A conveyor oven heats food items from both the top and bottom of the tunnel portion of the oven. These heating sources may be of any type known in the art, such as convection, flame or infrared radiation. Ideally, the heat sources used provide only infrared radiation generated by either gas powered heat plenums, gas powered porous grates, electric heating coils within the infrared radiation source, or any other method of generating infrared radiation for cooking. These methods of infrared radiation heating are well known in the art. Infrared radiation sources are preferred because of their high efficiency and low amount of waste heat generated. This provides a more comfortable working environment for the operators and lower cost in maintaining a comfortable dining environment.

The bottom heating element is located within the loop of the continuous conveyor belt. This provides efficient heating of the conveyor belt itself, which then transfers heat to the food items resting upon it. Sufficient heating of the conveyor belt is necessary to facilitate the heat transfer necessary to impart superior quality to the food items.

The conveyor oven has at least one temperature sensing means. Preferably there are two temperature sensing means. One senses the temperature within the tunnel portion of the oven. The second measures either the temperature directly below the upper part of the conveyor loop or the temperature of the upper part of the conveyor loop itself.

The conveyor oven will have means of controlling the temperature of the tunnel portion of the oven. This includes means of adjusting the heating element within the loop of the conveyor separately from the heating elements on the top and sides of the tunnel. This ensures the important proper heat transfer through the conveyor belt.

The path of the conveyor belt includes at least one support roller. Because a stone-like conveyor belt is heavy, support rollers are used to prevent sagging of the belt on its path through the tunnel portion of the oven. Additionally, these support rollers may extend the entire width of the conveyor belt, or may operate only on a portion of the belt passing over the roller. They may be located on the lateral ends of the belt's pathway, or may be located in the center. Support rollers may also include means such as teeth or grooves to maintain the belt on a straight path.

Alternatively, a shelf ledge support device may be used. This shelf ledge may also include guide rails to prevent lateral movement of the conveyor belt.

Located on at least the output end and possibly on the input end of the conveyor belt loop is a sprocket. The sprocket includes teeth designed to engage the conveyor belt. The sprocket is powered by a motor sufficiently powerful to move the conveyor belt at a constant speed through the loop pathway. The present invention also includes a means to adjust the speed of the sprocket, thereby adjusting the speed of the conveyor belt. This in turn adjusts the cooking time of the food items. Additional sprockets may be placed about the conveyor belt to facilitate a steadier rate of motion.

The conveyor belt includes a series of stone-like tablets extending the width of the conveyor belt. The tablets are sequentially aligned in the longitudinal direction of the conveyor belt. On both ends of the individual tablets are bracket assemblies. These bracket assemblies include a means of attachment to the tablet, a means of connecting to the bracket assembly on the opposite end of the same tablet and a means of rotatably attaching to bracket assemblies in front of and behind it.

Preferably, but not necessarily, successive tablets fit together in a tongue and groove fashion. The forward facing ends of the tablets have a downward wedge shape while the backward facing ends have an upward wedge shape. This provides a continuous, rather than a grated, surface for the food to be cooked on. This increases the heat transfer from the tablets to the food items and decreases the heat transfer directly from the heat source to the food items.

In one particular embodiment, the conveyor oven 10 comprises a base 11 having a front 12 and a rear 14. Resting upon the base is a conveyor apparatus 18. Above the conveyor apparatus 18 is the upper housing 16 which contains an infrared radiation heater 20. Upper housing 16 may also include a heat plenum. Heat sensor 17 measures the temperature of the oven above the conveyor belt 27 and is connected to a control means for regulating the temperature of the oven.

The conveyor apparatus includes a conveyor belt 27. Infrared heater 20 is positioned so that it radiates infrared energy toward the upper portion of the conveyor belt 29. Infrared radiation heater 22 is located between the upper portion of the conveyor belt 29 and the lower portion of the conveyor belt 28. Heater 22 is also focused on the upper portion of the conveyor belt 29. Heat sensor 19 measures the temperature of the oven between the upper and lower portions of the conveyor belt 27 and is connected to a control means for regulating the temperature of the oven.

Sprocket 26 and/or sprocket 24 rotate so as to move the conveyor belt such that the upper portion of the conveyor loop 29 moves from the front to the rear of the oven and the lower part of the conveyor loop 28 moves in the opposite direction. Sprocket 26 is connected to a motor 80 that powers the rotation of the sprocket. Support rollers 72 support the conveyor belt 27 and prevent sagging as the belt passes through the oven 10. Rollers 72 need only come in physical contact with the upper portion of the conveyor belt 29, but may also contact the lower portion 28. Conveyor apparatus 18 may include guide rails to prevent lateral motion of conveyor belt 27. Sprockets 26 and 24, and rollers 72 may be cylindrical and extend the entire width of the conveyor belt 27. Alternatively, the sprockets and rollers may be more wheel-shaped and extend across only a small portion of the width of the conveyor belt. Additionally, said sprockets and rollers may consist of a plurality of wheels aligned transverse to the longitudinal direction of the conveyor belt.

An uncooked food item is placed on the loading section of the conveyor apparatus 30. The motion of the belt 27 carries the uncooked food into the tunnel portion of the oven 34 where the food is exposed to infrared radiation from heater 20. In addition, infrared heater 22 transfers heat to the upper portion of the conveyor belt 29. Conveyor belt portion 29 subsequently transfers heat to the food being cooked. After a period of time determined by the speed of the conveyor belt 27, the food exits the tunnel 34 and appears on the unloading section of the conveyor 32. Upon entering conveyor belt section 32 the food item is fully cooked. The operator then removes the fully cooked food item. As many food items may be placed on loading section 30 as will fit and the oven may be run continuously. This facilitates a very high throughput for a healthy baking apparatus.

In addition, the conveyor oven may also be used to bring several food items up to the same temperature simultaneously. Partially and/or fully cooked items are placed on the loading section of the conveyor apparatus 30. Conveyor belt 27 carries the food items through the tunnel portion of the oven 34 where the food is exposed to infrared radiation. When the food items exit the oven onto the unloading section 32, all of the food items are fully cooked, and all are at the same temperature. In this manner, a large variety of foods, all requiring different cooking times, may be served simultaneously. All of the food items appear and taste as though having just completed their preparation.

Figure 6:
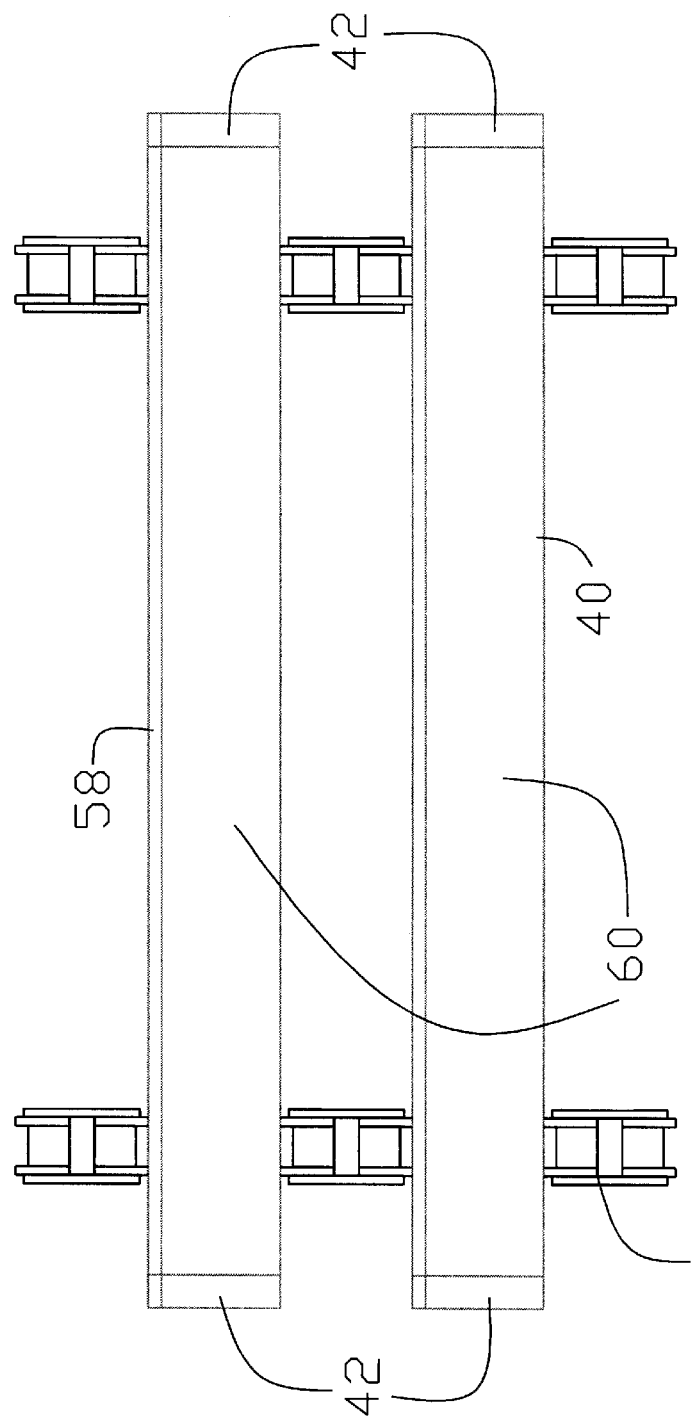
FIG. 6 is a top plan view of a portion of the conveyor belt.
Figure 7:
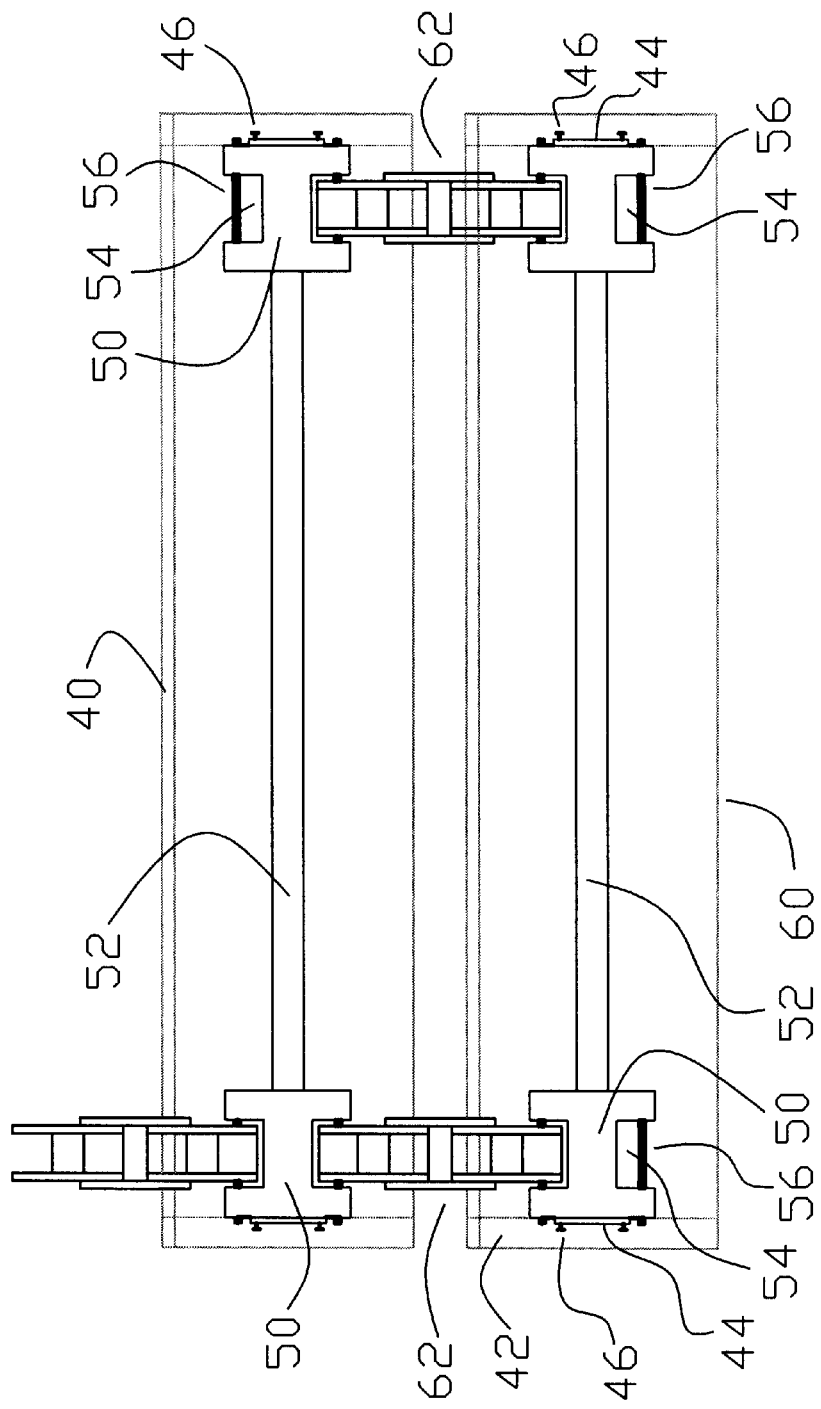
FIG. 7 is a bottom plan view of a portion of the conveyor belt.
Figure 8:
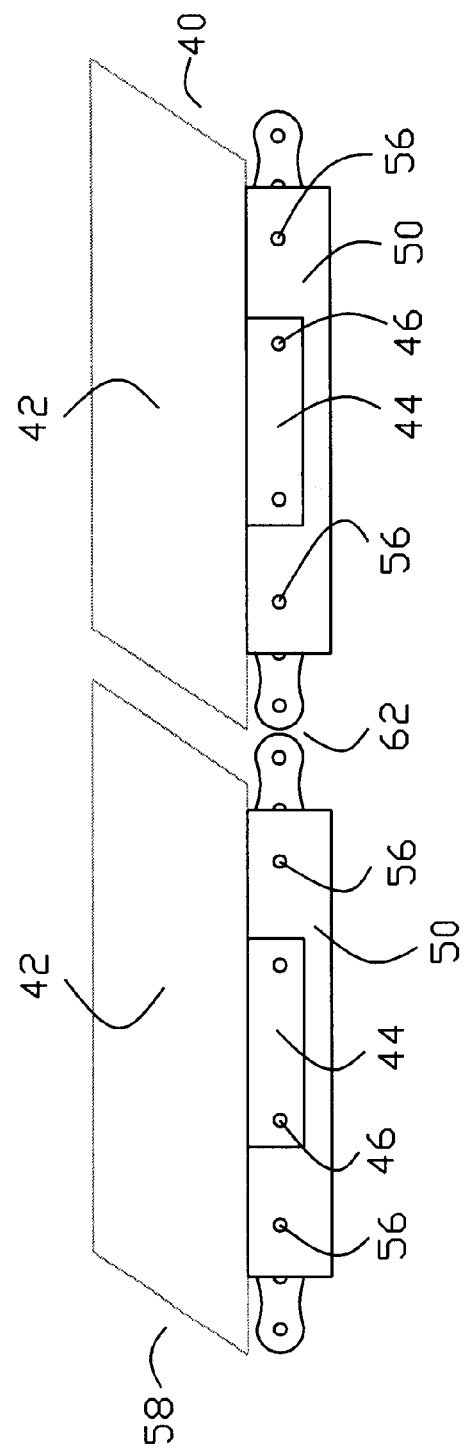
FIG. 8 is a perspective view of a portion of the conveyor belt.
Figure 9:
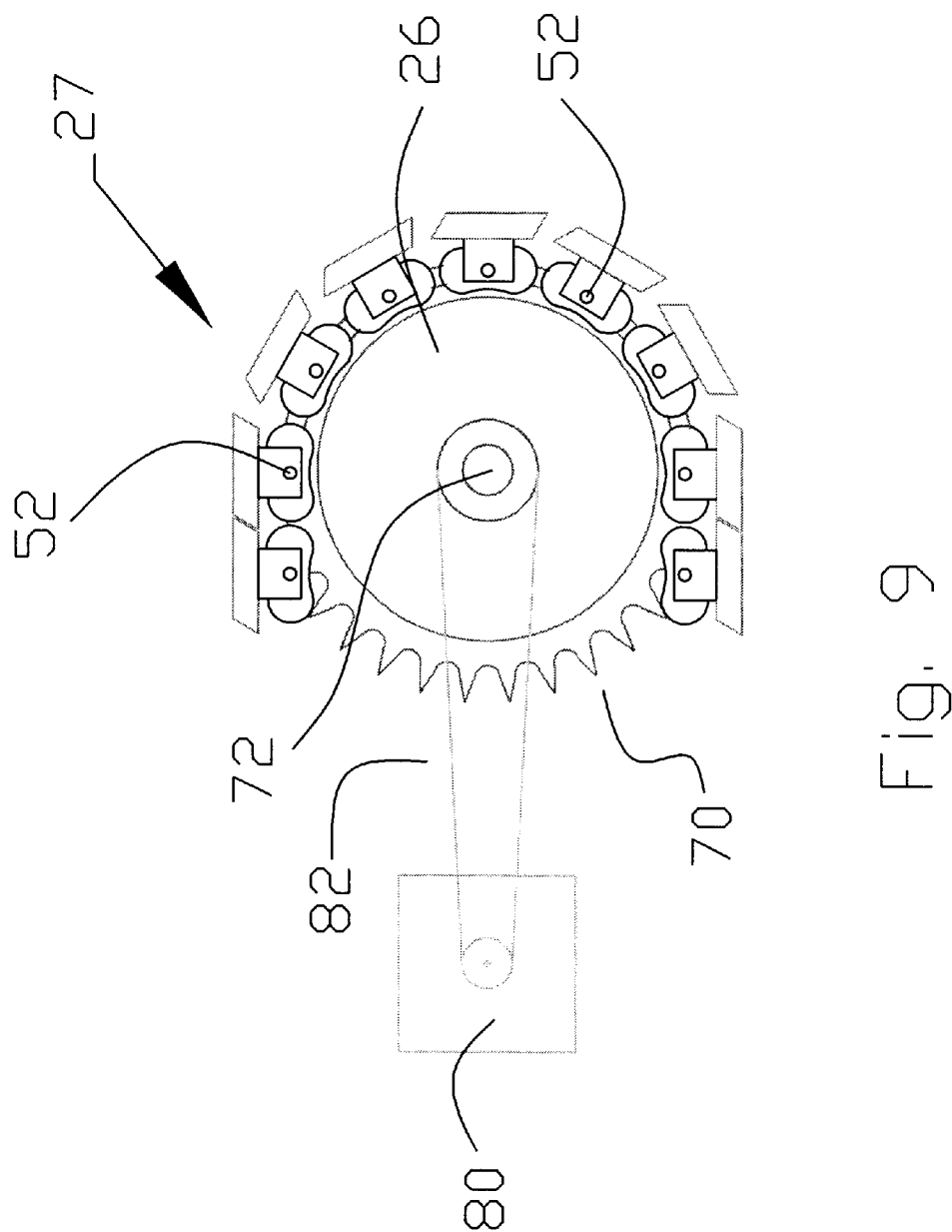
FIG. 9 is an enlarged side elevational view of the rear sprocket assembly.
Figure 10:
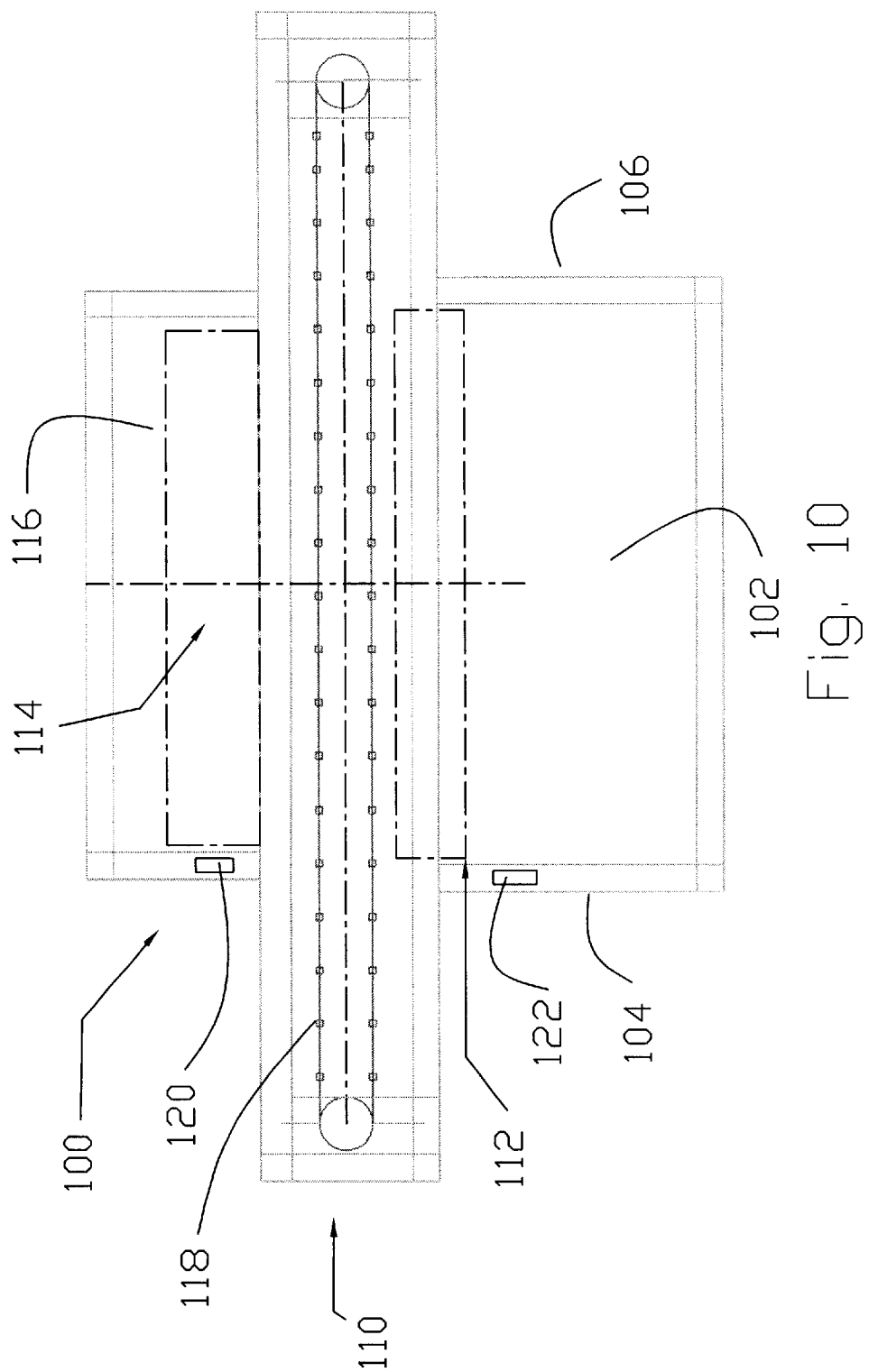
FIG. 10 is a partially fragmented, side elevational view of another exemplary embodiment of the invention with portions omitted for clarity.
Figure 11:
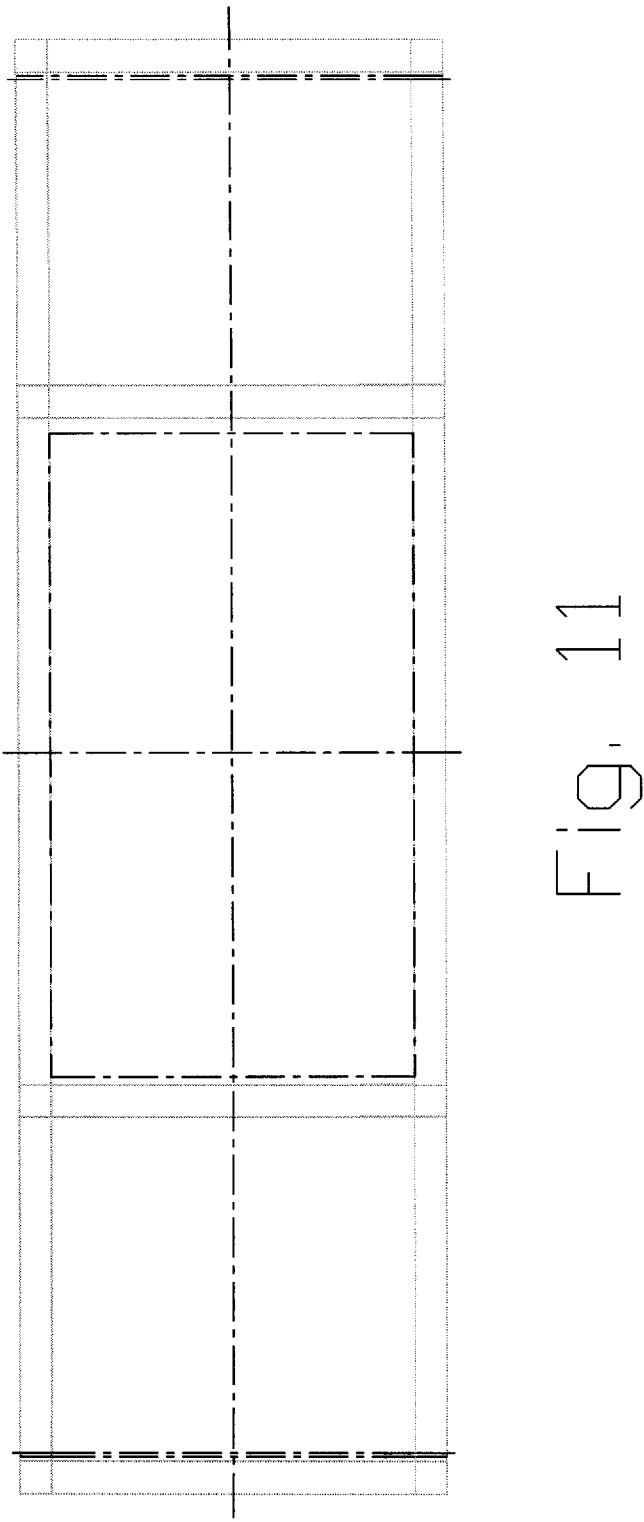
FIG. 11 is a top plan view thereof.
Figure 12:
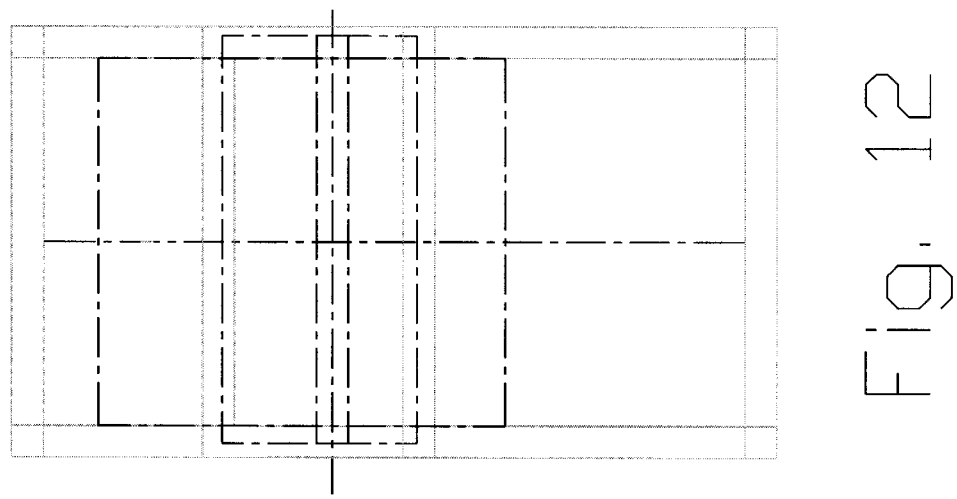
FIG. 12 is a front elevational view thereof.

FIG. 6 shows a portion of the conveyor belt from the outer side of the belt. It consists of stone-like tablets 60 approximately two inches wide and extending the width of the conveyor belt. The tablets 60 are held in place by stainless steel tablet guards 42. FIG. 7 shows the same portion of the conveyor belt from the opposite direction. FIG. 8 shows a side elevated view of the tablet guards 42 and bracket assemblies 50. In this particular embodiment, tablets 60 are parallelpiped in shape, having a parallelogram-shaped cross section. Tablets 60 may alternatively be cylindrical or a variety of other shapes. In this embodiment, sequential tablets fit together in a tongue and groove fashion. The front portion of a tablet 58 fits below the wedge shaped rear portion of a preceding tablet 40. Tablet guards 42 have a connecting plate 44 extending downward and running flush with the end of the bracket assembly 50. Connecting plate 44 is held to the bracket assembly 50 by screws 46. Stainless steel linkage 52 connects bracket assemblies on opposite ends of the same tablet 60. By removing screws 46, the tablet guard 42 may be removed. This facilitates easy, expedient replacement of tablet 60 in the event that it cracks or breaks. The conveyor belt may be left intact while a single tablet is replaced.

Bracket assemblies 50 are connected to other adjacent bracket assemblies on either side of them by stainless steel chains 62. Chains 62 are held in chain wells 54 by stainless steel chain dowels 56. Although this particular embodiment employs chains to connect adjacent bracket assemblies, other means may be used, such as rotatable connecting rods or the like.

FIG. 7 shows rear sprocket 26 which rotates about its axle 72. Teeth 70 located along the circumference of the sprocket engage the bracket assembly linkages 52. Sprocket 26 is turned by a motor 80 connected to sprocket 26 by rotational motion transfer means. Sprocket 26 in turn causes conveyor belt 27 to move along the conveyor loop pathway. Motor 80 may be adjusted to increase or decrease the speed of the conveyor belt in order to adjust the cooking time of food items. Additionally, sprocket 24 may be connected to motor 80 in a similar fashion. Sprocket 24 may alternatively be connected to a similar separate motor.

In another exemplary embodiment, stone-like tablets 206 are attached to stainless steel support plates 200 by attachment screw 202. Support plates 200 are attached to drive chain 204. In this particular embodiment, drive chain 204 resembles the type of drive chain used on bicycles. However, those skilled in the art will appreciate that a wide variety of drive chain designs may be used. The most important features of drive chain 204 are its attachment to support plates 200 and its ability to interlock with teeth on sprockets 26 and 24. Stone-like tablets 206 are attached to drive chains in the manner described on both ends of each tablet. As with the previous embodiment, a single stone like tablet may be replaced without disassembling the entire conveyor belt.

This conveyor belt is powered in a fashion similar to that of the previous embodiment. A motor 80 rotates sprocket 26 about its access 72. Drive chain 204 interlocks with sprocket teeth 70. As sprocket 26 rotates, the conveyor belt moves along its path.

In another exemplary embodiment, a conveyor oven 100 comprises a base 102 having a front 104 and a rear 106. Resting upon the base 102 is a conveyor apparatus 110 that traverses the length of the oven. Located in base 102, underneath conveyor apparatus 110, is an infrared radiation heating element 112. Above the conveyor apparatus 110 is an upper housing 116, which contains an upper infrared radiation heater 114. Conveyor belt 118 moves along a continuous pathway in a manner such that its upper portion moves from the forward end of the oven 104 towards the rear end of the oven 106. Electromagnetic radiation emitting apparatus 120 emits a beam of a predetermined wavelength downward toward a beam sensor 122. When a food item is placed on conveyor belt 118, it passes between emitter 120 and sensor 122, disrupting reception of the electromagnetic beam by sensor 122. Sensor 122 is connected to a heater control means which is subsequently connected to heaters 114 and 112. When sensor 122 detects a disruption in the electromagnetic beam it sends a signal to the control means. The control means subsequently signals heaters 112 and 114, switching them on. The heater control means is equipped with a means of determining when said food item exits the oven at the rear end 106. Upon exiting of said food item, the control means switches off the upper and lower heaters 114 and 112. In this manner, heaters 114 and 112 are only on and emitting heat when the oven is in use. This provides for an oven that is both cheaper and more efficient. In addition, the reduction in waste heat provides for a more comfortable working environment for the operator and greater ease in maintaining a comfortable ambient temperature throughout a restaurant.

Emitter 120 and sensor 122 may have their locations switched, so that the emitter is below the conveyor belt and the sensor is above the conveyor belt. Another possible alternative places the emitter and sensor on either sides of the entrance to the oven. The important aspect of this part of the oven is that food entering said oven disrupts a beam being transmitted from the emitter to the sensor.

In yet another alternative embodiment suitable for large commercial and/or industrial applications, the preceding conveyor oven may also run continuously to maintain an acceptable throughput. This embodiment may also be sized to accept larger throughput as well. Such an embodiment is useful in the preparation of pre-cooked meals and the like.

Figure 13:
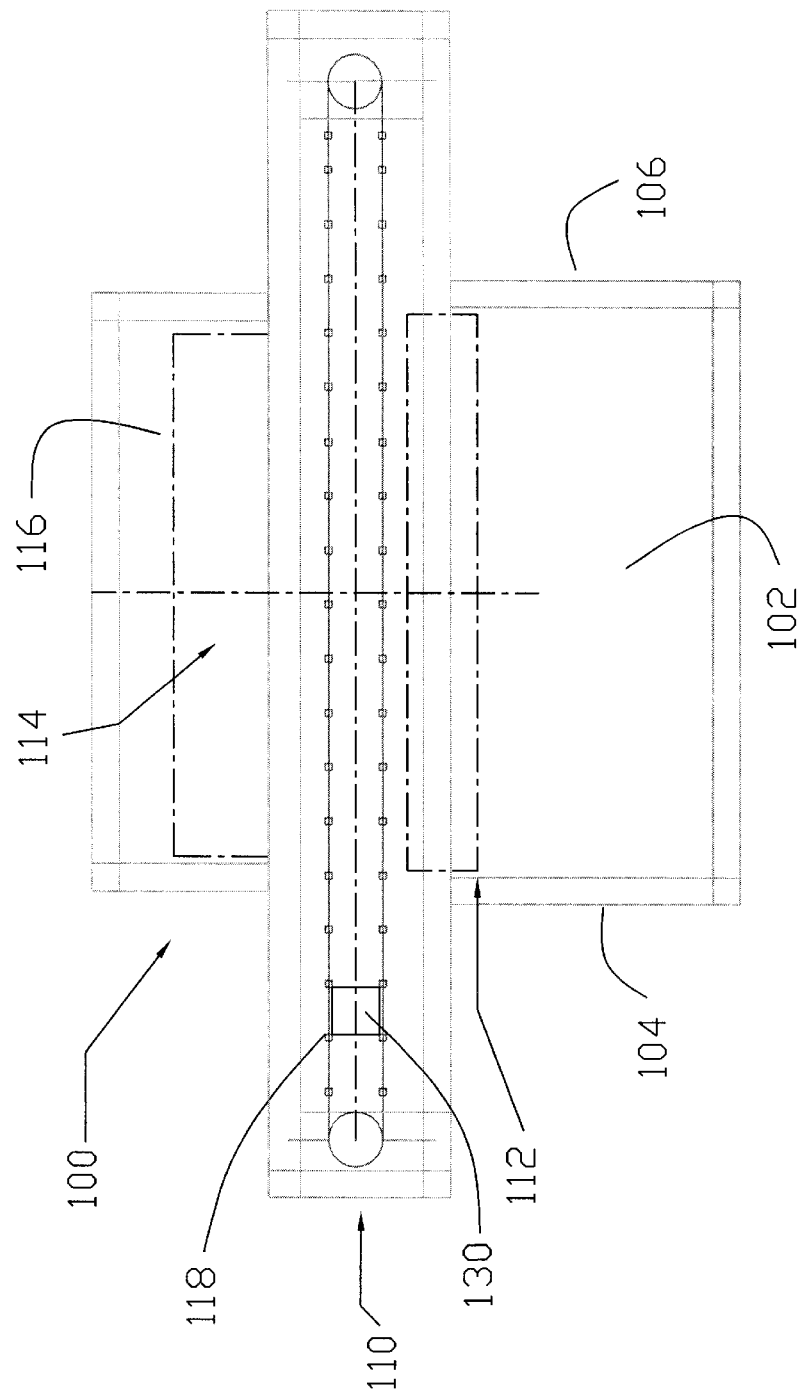
FIG. 13 is a partially fragmented, side elevational view of another exemplary embodiment of the invention with portions omitted for clarity.
Figure 14:
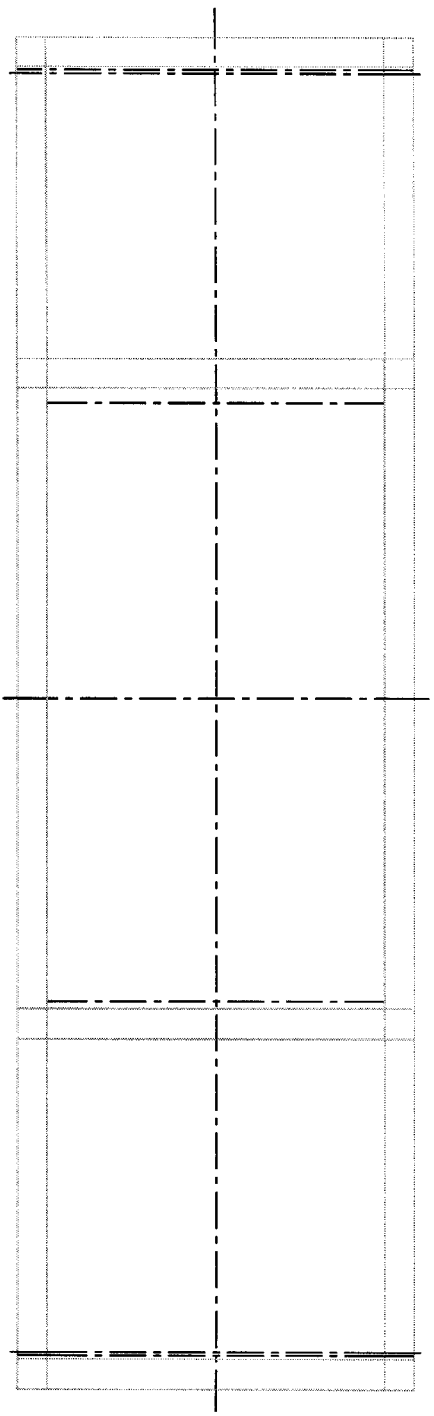
FIG. 14 is a top plan view thereof.
Figure 15:
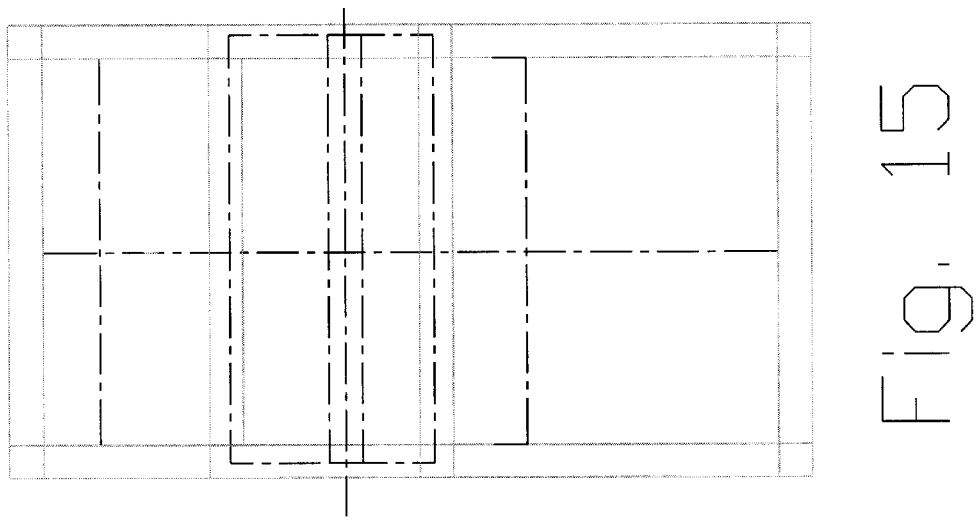
FIG. 15 is a front elevational view thereof.
Figure 16:
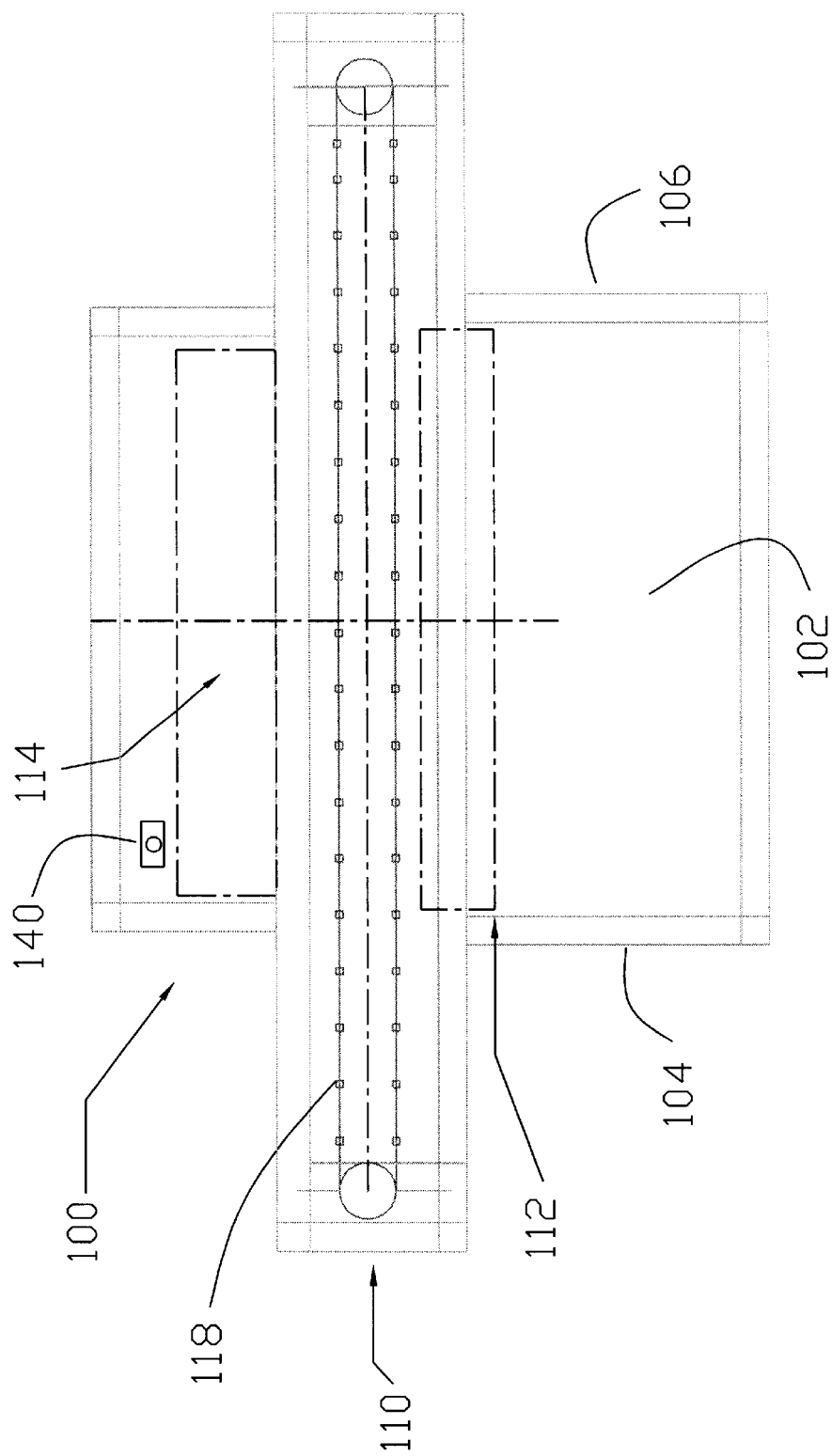
FIG. 16 is a partially fragmented, side elevational view of another exemplary embodiment of the invention with portions omitted for clarity.
Figure 17:
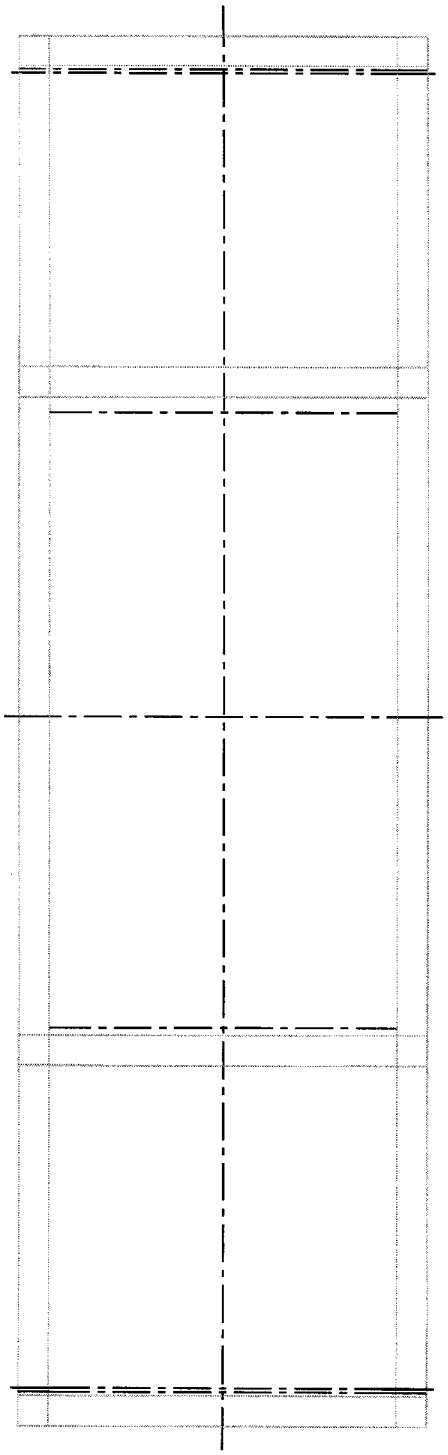
FIG. 17 is a top plan view thereof.
Figure 18:
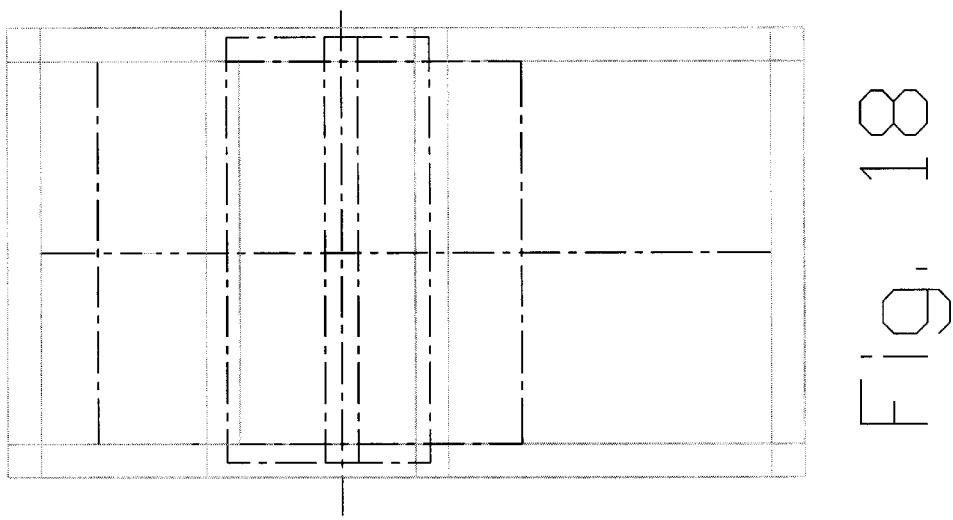
FIG. 18 is a front elevational view thereof.

In an alternative method for minimizing waste heat, a weight detection mechanism is used as shown in FIG. 13. Weight detection means 130 detects when food items are placed on the conveyor belt 118 by detecting a change in weight of the upper portion of the conveyor belt directly above it. Weight detection means 130 subsequently signals a heater control means which then signals heaters 112 and 114 to switch on. As in the previous embodiment, the heater control means has connected to it or within it a means of determining how long it will take a food item to traverse the length of the conveyor apparatus 110. Once the food item exits the oven, the heater control means switches off heaters 114 and 112.

In yet another embodiment, an external switching mechanism 140 is located on the exterior of oven 100. Switch 140 is connected to heaters 114 and 112. When an operator places a food item on conveyor 118, he then immediately operates switch 140 so as to switch on and adjust heaters 114 and 112. Switch 140 may be designed so as to control heaters 112 and 114 independently. Switch 140 switches on and off heaters 112 and 114, and is also used to adjust the heat emission of each respective heater. Switch 140 contains within it a means of determining when a food item will exit said oven. As in the previous embodiments, once food exits the oven on conveyor belt 118, switch 140 turns off heaters 112 and 114.

Control means for heaters 112 and 114 may be either mechanical or electrical. Means for determining when a food item will exit said oven may also be either electrical or mechanical. The means of determining time of food item exit may additionally be connected to the means used to propel the conveyor belt along its continuous path.

A comparison of the present invention to known methods is shown in Tables I and II, attached hereto.

Whereas, the present invention has been described in relation to the drawings attached hereto, it should be understood that other and further modifications, apart from those shown or suggested herein, may be made within the spirit and scope of this invention.

What is claimed is:

1. A conveyor oven including a conveyor belt having a series of tablets comprised of a stone-like material sequentially arranged in the longitudinal direction of the conveyor belt, said oven comprising:

a housing with spaced apart ends penetrated by an aperture;

a conveyor apparatus for moving food through said housing, said apparatus including said tablets;

bracket assemblies disposed at both ends of each of said tablets;

a linking means of rotatably connecting longitudinally adjacent bracket assemblies, and p1 a linking means of connecting bracket assemblies disposed at both ends of the same tablet;

an upper heat source above said pathway and a long heat source between said upper and lower portion of said pathway;

a means of powering said conveyor apparatus so as to move said conveyor belt about a pathway;

a means of detecting a food item entering said conveyor oven;

a heater control means connected to said upper source, said long heat source, and said food item detection means;

a means for determining when a food item exits said conveyor oven, connected to said heater control means.

2. A conveyor oven according to claim 1 wherein said bracket assemblies further comprise removable tablet guards that hold said tablets in place.

3. A conveyor belt according to claim 1 wherein said bracket assemblies are comprised of stainless steel.

4. A conveyor belt according to claim 1 wherein said linking means are comprised of stainless steel.

5. A conveyor belt according to claim 1 wherein said linking means of rotatably connecting longitudinally adjacent bracket assemblies are comprised of stainless steel chains.

\* \* \* \* \*